(12) United States Patent
Barabash et al.

(10) Patent No.: US 11,178,217 B2
(45) Date of Patent: Nov. 16, 2021

(54) DNS-BASED IN-PACKET SERVICE VERSION TAGGING

(71) Applicant: International Business Machines Corporation, Armonk, NY (US)

(72) Inventors: Katherine Barabash, Haifa (IL); Dean Lorenz, Haifa (IL); Eran Raichstein, Yokneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 15/401,113

(22) Filed: Jan. 9, 2017

(65) Prior Publication Data

US 2018/0198851 A1 Jul. 12, 2018

(51) Int. Cl.
*H04L 29/12* (2006.01)
*H04L 29/08* (2006.01)
*H04L 29/14* (2006.01)
*H04L 12/803* (2013.01)

(52) U.S. Cl.
CPC ........ *H04L 67/1002* (2013.01); *H04L 47/125* (2013.01); *H04L 61/1511* (2013.01); *H04L 69/40* (2013.01); *H04L 61/2007* (2013.01)

(58) Field of Classification Search
CPC .................................................. H04L 67/1002
USPC ......................................................... 709/226
See application file for complete search history.

(56) References Cited

U.S. PATENT DOCUMENTS

| 7,676,561 | B1* | 3/2010 | Rai ........................ G06F 9/505 709/223 |
| 9,110,728 | B2 | 8/2015 | Shen et al. |
| 9,215,229 | B2 | 12/2015 | Eicken et al. |
| 9,270,521 | B2 | 2/2016 | Tompkins |
| 2003/0126252 | A1* | 7/2003 | Abir .................... H04L 67/1038 709/223 |
| 2005/0249134 | A1* | 11/2005 | Lin ........................ H04L 51/04 370/278 |
| 2012/0066371 | A1* | 3/2012 | Patel ................... H04L 67/1031 709/224 |
| 2013/0198319 | A1* | 8/2013 | Shen ...................... G06F 9/455 709/217 |

(Continued)

OTHER PUBLICATIONS

DNS Failover for Elastic Load Balancing., "Elastic Load Balancing"; AWS | Elastic Load Balancing Cloud Network Load Balancer, Amazon Web Services, p. 3, Aug. 8, 2016.

*Primary Examiner* — Moustafa M Meky
*Assistant Examiner* — Sm Z Islam
(74) *Attorney, Agent, or Firm* — Gregory J Kirsch

(57) ABSTRACT

Embodiments of the present communications systems and methods may provide the capability for fast and reliable transitioning between the different versions of the service of the multi-node service deployed in the utility computing system. For example, in an embodiment, a computer-implemented method for data traffic distribution may comprise allocating a plurality of data traffic service network addresses to a load balancer service, wherein each data traffic service network address is associated with a different version of the load balancer service, receiving a plurality of data traffic flows, and distributing each data traffic flow to a version of the load balancer service based on a data traffic service network address of each data traffic flow.

16 Claims, 3 Drawing Sheets

(56) References Cited

U.S. PATENT DOCUMENTS

| | | | |
|---|---|---|---|
| 2013/0332584 A1* | 12/2013 | Sun | H04L 61/251 |
| | | | 709/219 |
| 2015/0040025 A1 | 2/2015 | Deklich et al. | |
| 2016/0094453 A1* | 3/2016 | Jain | H04L 47/6225 |
| | | | 370/235 |
| 2016/0112903 A1* | 4/2016 | Kaushik | H04L 47/20 |
| | | | 370/235 |
| 2016/0373405 A1* | 12/2016 | Miller | G06F 9/45558 |

\* cited by examiner

DNS-BASED IN-PACKET SERVICE VERSION TAGGING

BACKGROUND

The present invention relates to techniques for data traffic distribution by allocating data traffic service network addresses to a load balancer service, wherein each data traffic service network address is associated with a different version of the load balancer service including, in a broader sense of version, changes such as configuration changes, node upgrades, and elastic changes to the service pool size of the service, etc.

In utility computing environments such as cloud computing environments, it is advantageous to ensure the services can elastically grow and shrink according to the load imposed by their clients. When the load goes up, the system should adapt by allocating more resources and increasing the service capacity so that clients do not experience disturbances due to the increased load. When the load goes down, the system should adapt by timely releasing the unneeded resources to reduce the overall operational costs and/or improve the overall resource utilization by assigning the resources elsewhere.

Service elasticity is typically implemented through a scalable pool of service nodes, wherein nodes are added and removed to align allocated capacity to the total demand. An additional entity, a load balancer, may be installed to receive client requests and to multiplex them among the nodes in the service pool.

The load balancer is an important component that should be configured correctly to provide a distribution of load over the service nodes. The load balancing algorithm should take into account many parameters, such as service pool size, capacity of individual servers in the pool, utilization of service pool resources, health of service pool resources, service versioning, request characteristics, etc. Moreover, the load balancer may also off-load some common tasks from the service nodes, such as encryption, Network Address Translation, port blocking, etc. To ensure that the load balancer is not a single point of failure or a service bottleneck, the load balancer may also be implemented as an elastic service using a pool of load balancer nodes. In this case, which is called Elastic Load Balancing (ELB), there should be an extra layer that distributes load over the load balancer instances. This extra layer may be called a Distributor. This Distributor load balancing extra layer is typically very simple and less flexible to ensure robustness and low overhead and to readily allow a HW based implementation.

Load balancers should support dynamic configuration. Some input parameters, such as the pool size and load, are inherently dynamic. Likewise, the load balancer should react quickly to any change. For example, load balancers should be quick to use new/underutilized nodes and quick to avoid unhealthy nodes. Other parameters, such as the service version of each node in the pool, may be less dynamic, but still change over time. On the other hand, the load balancing decision should not be too dynamic and should adhere to consistency requirements. For example, packets from a single TCP stream should all be forwarded to the same end-point. This is known as flow affinity. As another example, new connections should be forwarded to nodes running the latest service version to allow phasing out of nodes that run older service versions. This is a rolling upgrade scenario. As yet another example, it is desirable that when a new node is added to the pool, an even portion of traffic is forwarded to it, yet most requests are not affected and maintain their forwarding destination. This is known as consistent mapping.

The consistency requirements may require that the load balancer maintains state, which may lead to scalability issues. For example, the Distributor in the ELB setting may not scale well if required to maintain state, especially per-flow state. It may be possible to capture a minimal state as a 'Version' of the load balancer configuration. However, there still needs to be some mechanism to consistently map traffic flow to a particular version.

Accordingly, a need arises for a technique which provides fast and reliable transitioning between different versions of the multi-node service deployed in the utility computing system, including, in a broader sense of version, changes such as configuration changes, node upgrades, and elastic changes to the service pool size of the service, etc.

SUMMARY

Embodiments of the present communications systems and methods may provide the capability for fast and reliable transitioning between the different versions of the service of the multi-node service deployed in the utility computing system, wherein, in a broader sense of version, changes such as configuration changes, node upgrades, and elastic changes to the service pool size of the service, etc., may be included.

For example, in an embodiment, a load balancer may be configured to make per-flow stateless yet deterministic/consistent decisions based only on the version of the load balancer configuration. For example, the load balancer may use hashing based on traffic flow parameters. In an embodiment, several service IP addresses may be allocated to the load balancer service and a different version of the service may be associated with a different service IP address. A Domain Name Server (DNS) may be used to map traffic flows to a particular version. Old traffic flows may maintain their state and new traffic flows may be mapped to the current version. Accordingly, the number of public IP addresses may be as low as the number of concurrent states. Furthermore, failover may be partially handled by the client. For example, if the traffic flow fails the client may reestablish the traffic flow using a different IP address, and consequently, a different version. Since each packet may be associated with and identify the destination version of the traffic flow, as represented by the destination IP address of the packet, the load balancer may not need to track traffic flows or keep per-flow state.

For example, in an embodiment, a computer-implemented method for data traffic distribution may comprise allocating a plurality of data traffic service network addresses to a load balancer service, wherein each data traffic service network address is associated with a different version of the load balancer service, receiving a plurality of data traffic flows, and distributing each data traffic flow to a version of the load balancer service based on a data traffic service network address of each data traffic flow.

For example, in an embodiment, the method may further comprise transitioning to a version of the load balancer service by allocating a data traffic service network address associated with the version of the load balancer service. The method may further comprise de-allocating a data traffic service network address associated with a version of the load balancer service. The allocated data traffic service network addresses may be registered in a Domain Name server. A configuration of each version of the load balancer service may include a set of data traffic flow rules. The data traffic flow rules may be configured in a traffic distributor. The traffic distributor may be an OpenFlow network switch.

For example, in an embodiment, a system for data traffic distribution may comprise at least one Domain Name server storing an allocation of a plurality of data traffic service network addresses to a load balancer service, wherein each data traffic service network address is associated with a different version of the load balancer service and at least one traffic distributor receiving a plurality of data traffic flows and distributing each data traffic flow to a version of the load balancer service based on a data traffic service network address of each data traffic flow.

For example, in an embodiment, a computer program product for data traffic distribution may comprise a non-transitory computer readable storage having program instructions embodied therewith, the program instructions executable by a computer, to cause the computer to perform a method comprising allocating a plurality of data traffic service network addresses to a load balancer service, wherein each data traffic service network address is associated with a different version of the load balancer service, receiving a plurality of data traffic flows, and distributing each data traffic flow to a version of the load balancer service based on a data traffic service network address of each data traffic flow.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Figure 1:
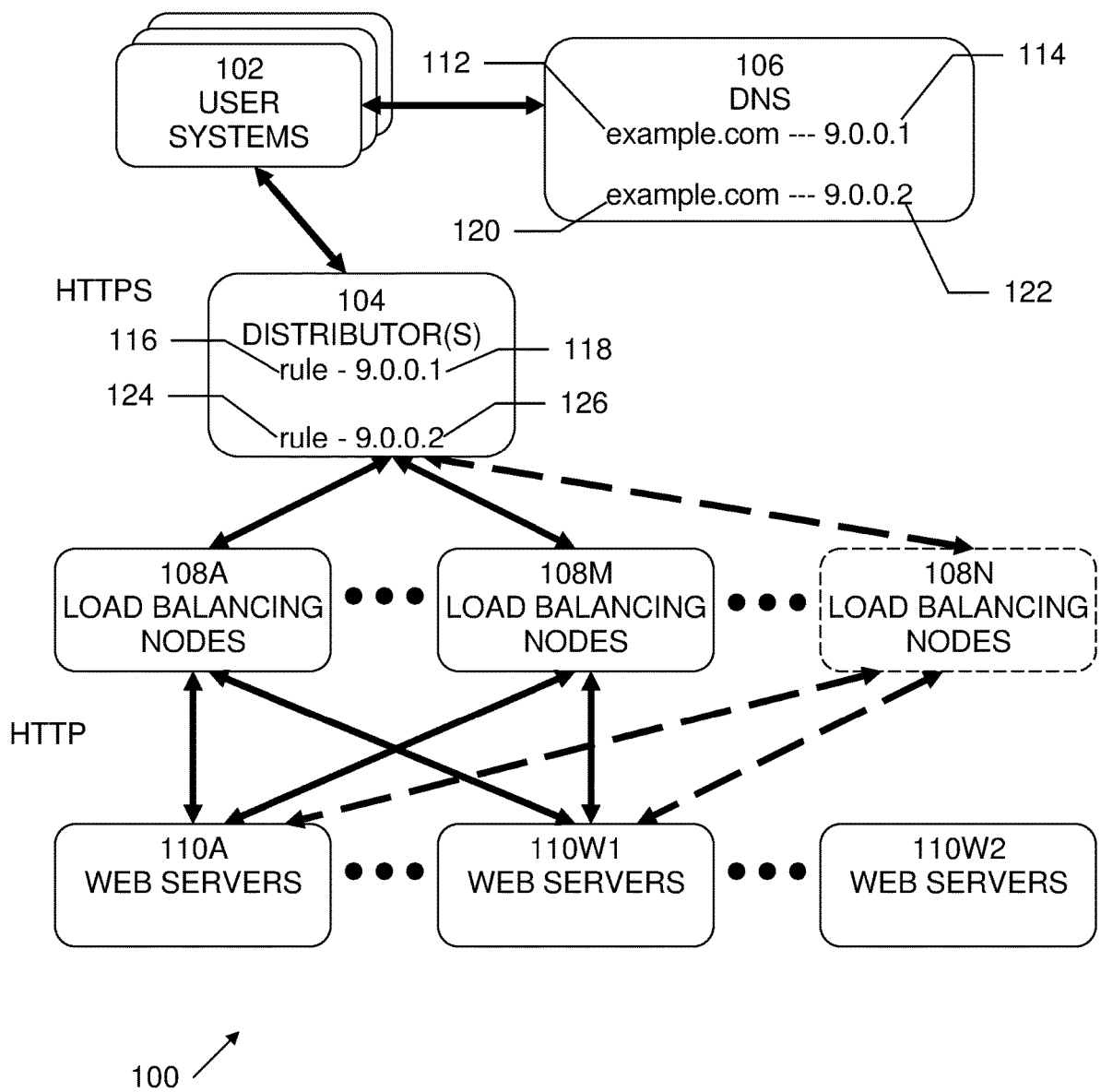
FIG. 1 is an exemplary block diagram of a computing environment in which described embodiments may be implemented.

An exemplary computing environment 100 is shown in FIG. 1. In this example, computing environment 100 may include a plurality of user systems 102, one or more traffic distributors 104, one or more Domain Name System (DNS) servers 106, a plurality of load balancing nodes 108, and a plurality of back-end pool nodes 110. User systems 102 may include computer systems that may be operated by, or on behalf of, users of any type, such as individuals, automated systems, organizations, etc. Traffic distributors 104 may include computer networking devices that connect devices together on a computer network, by using packet switching to receive, process, and forward data to the destination devices. For example, traffic distributors 104 may be implemented in one or more software-based network switches, in one or more hardware-based network switches, in one or more software-based network routers, in one or more hardware-based network router, in one or more dedicated software functions in one or more other devices or types of devices, or in one or more dedicated hardware devices. For example, traffic distributors 104 may be implemented to include one or more SDN OpenFlow enabled switches, which may allow programmatically adding and removing traffic flow forwarding (or processing) rules. OpenFlow is a communications protocol that gives access to the forwarding plane of a network switch or router over the network. OpenFlow may be used to enable software defined networking (SDN) in a network. It is also to be noted that network switches, routers, and other devices, which are not shown in FIG. 1, may be present in computing environment 100. For example, there may be network switches present between load balancing nodes 108 and back-end pool nodes 110, in order to provide the desired network connectivity.

DNS server 106 manages a database that maps domain names to IP addresses. DNS server 106 may allow adding, removing and editing DNS records. Load balancing nodes 108A-M may each spread traffic to other devices, such as back-end pool nodes 110A-X, which may typically include back-end web servers, or other servers, storage, or computing devices. The number of load balancing nodes may change. In this example, initially there are M load balancing nodes 108A-M, but the number of load balancing nodes may change to N, resulting in load balancing nodes 108A-N. Likewise, the number of back-end pool nodes may change. In this example, initially there are W1 back-end pool nodes 110A-110W1, but the number of back-end pool nodes may change to W2, resulting in back-end pool nodes 110A-110W2.

Figure 2:
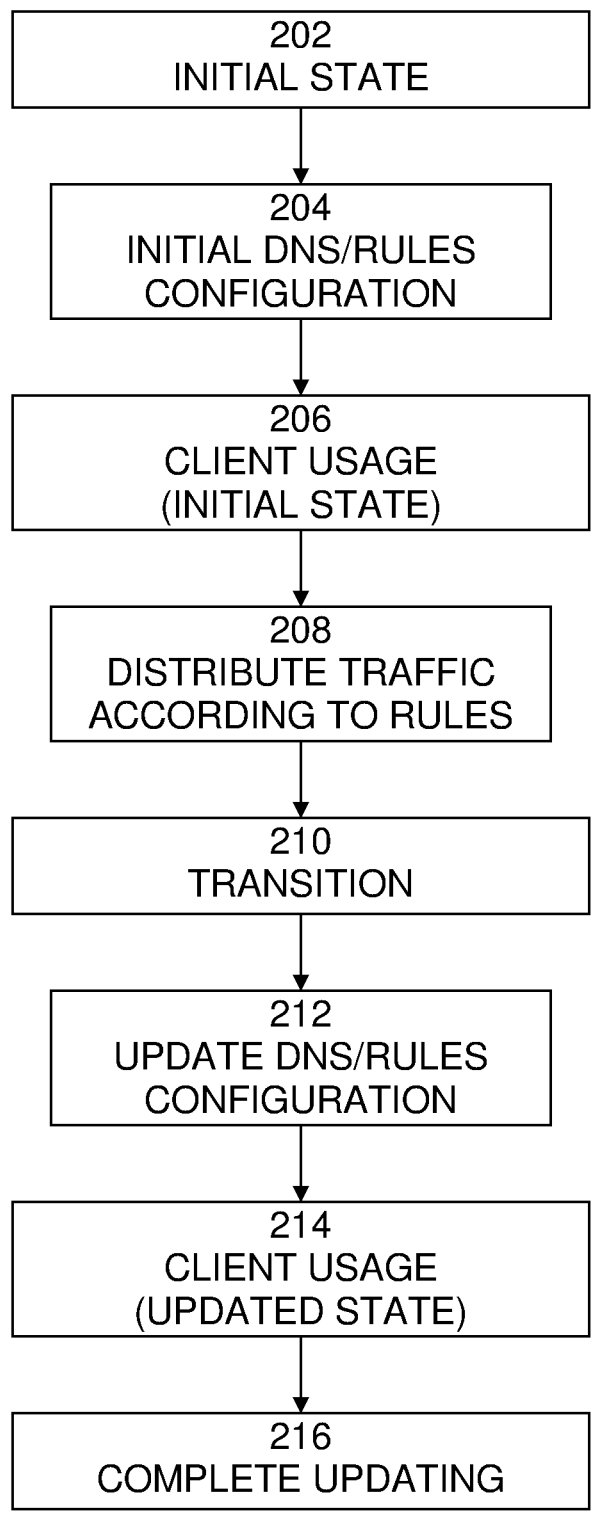
FIG. 2 is an exemplary flow diagram of a process for transitioning between different versions of multi-node load balancing services.

An exemplary flow diagram of a process 200 for transitioning between different versions of multi-node load balancing services is shown in FIG. 2. It is best viewed in conjunction with FIG. 1. Process 200 begins at block 202, in which system 100 in in an initial state. At block 204, in an initial state of configuration of DNS 106, there may be one entry 112, such as example.com, with single public IP address 114, such as 9.0.0.1. Each load balancing node 108A-M may spread traffic to all or selected portions of backend pool nodes 110A-W1. Typically, user systems 102 communicate using a secure protocol, such as Secure Sockets Layer (SSL) or Transport Layer Security (TLS). Accordingly, user systems 102 may communicate using Hypertext Transfer Protocol (HTTP) within a connection encrypted by Transport Layer Security or its predecessor, Secure Sockets Layer. This is known as HTTPS. The load balancing nodes 108A-M may perform SSL or TLS termination, the state of which may be kept per traffic flow state.

Further at block 204, in an initial state of configuration, traffic distributors 104, which may be OpenFlow enabled switches, may spread traffic among load balancing nodes 108A-M according to defined rules, such as rule 116. In this example, the spreading rule used by traffic distributors 104 may be a simple modulo operation, with a modulus equal to the number M of load balancing nodes 108A-M, on bits in the source information (IP address and Port address) of each packet. In this example, the rule 116 matches, and is executed, only for packets destined for IP address 118, 9.0.0.1. Accordingly, this process creates IP address/PORT address affinity to traffic flows going into load balancing nodes 108A-M.

At block 206, client usage in the initial state may occur. Each client with traffic destined for example.com may access DNS 106 and obtain the initial IP address 114, 9.0.0.1. Each such client may then transmit traffic using HTTPS to traffic distributors 104. Traffic distributors 104 may search for rules that match the traffic they receive. At block 208, traffic addressed to 9.0.0.1 may match the IP address 118 in rule 116, and traffic distributors 104 may distribute the traffic accordingly.

At block 210, a transition to a different version of the load balancing service may occur. The transition may require the number of load balancing nodes to change from M to N, where N may be either less or more than M, due to changes in the traffic behavior of the service. Further, the number of back-end pool nodes in the pool may change from W1 to W2. At block 212, the configuration of DNS 106 may be updated. For example, a new public IP address 122, 9.0.0.2, may be assigned to the example.com entry 120. Further, the load balancing information for W2 servers 110A-W2 may be populated to the N (out of M) load balancing nodes 108A-N. A new rule 124, or set of rules, only for IP address 126, 9.0.0.2, may be created in traffic distributors 104. The rules spread traffic to the N load balancing nodes, again using, for example, modulo operation, with a modulus N. Likewise, DNS entry 112 may be updated with the new IP address 122, 9.0.0.2, and the old IP address 114, 9.0.0.1, may be removed. Alternatively a new DNS entry 120 including the new IP address 122, 9.0.0.2, may be created, and the old DNS entry 112 including the old IP address 114, 9.0.0.1, may be removed.

Optionally, load balancing nodes 108A-N may be configured not to accept new connections on the old IP address 114, 9.0.0.1. Alternatively, load balancing nodes 108A-N may be configured to accept new connections on the old IP address 114, 9.0.0.1.

At block 214, client usage in the updated state may occur. Each client with traffic destined for example.com may access DNS 106 and obtain the updated IP address 122, 9.0.0.2. Each such client may then transmit traffic using HTTPS to traffic distributors 104. New traffic flows may arrive with the updated IP address 122, 9.0.0.2, while old and in-progress traffic flows may arrive with the old IP address 114, 9.0.0.1. Traffic distributors 104 may search for rules that match the traffic they receive and may distribute the traffic accordingly.

At block 216, when all M load balancing nodes 108A-M report that there are no more old in-progress connections so that no traffic arrives with the old IP address 114, 9.0.0.1, the updating is completed. In order to complete the updating, rules in traffic distributors 104 with the old IP address may be removed. For example, rule 116 with the old IP address 114, 9.0.0.1, may be removed from traffic distributors 104. The load balancing nodes and backend pool nodes that are no longer needed may be released. For example, for N less than M, load balancing nodes 108N+1 to 108M and, for W2 less than W1, backend pool nodes 110W2+1 to 110W1 may be released. It should be noted that there may be no direct correlation between changes in the number of backend nodes 110 and changes in the number of load balancing nodes 108. Elasticity of the backend node pool may be autonomous of the elasticity of the load balancing node pool. The present communications systems and methods may include any type of backend node pool elasticity and any type of load balancing node pool elasticity. In addition, it should be noted that at this point the old IP address 114, 9.0.0.1, may now be released and may be reused for further version updates in a broader sense of version.

In some embodiments, a silent client may keep old IP address information from the DNS, such as IP address 114, 9.0.0.1, and may try to establish a new connection using that IP address. In this situation, such a client would fail to establish a new connection. However, as DNS information expires, this client would eventually perform another DNS query and obtain the updated IP address. In some embodiments, rather than refusing to accept new connections on the old IP address, such connection requests may be redirected to the new IP address. However, in such embodiments, redirecting requests for new connections on the old IP address to the new IP address may be performed only if the old IP address was released and is not representing any one of the currently active versions.

In some embodiments, it may be possible to re-use public IP addresses and in the next state transition, to use a public IP address. In general, the number of public IP addresses needed may equal the number of parallel states that need to be concurrently active in the system, for example, while load balancers do not report that there is no more traffic on an old IP address. Further, the number of rules that need to be kept may be linear to number of load balancing nodes multiplied by the number of states, and may not be proportional to the number of traffic flows.

Figure 3:
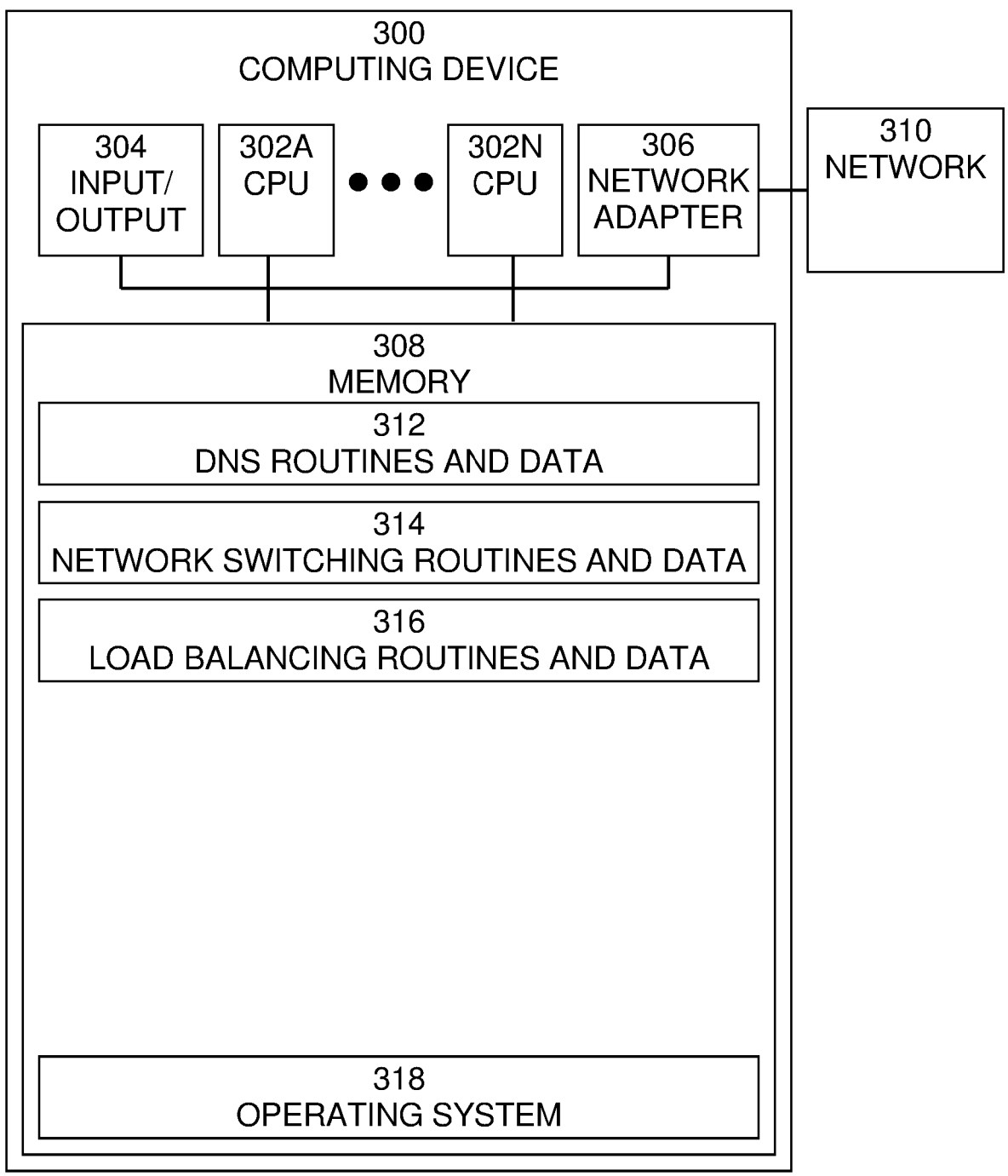
FIG. 3 is an exemplary block diagram of a computer system in which processes involved in the embodiments described herein may be implemented.

An exemplary block diagram of a computing device 300, in which processes involved in the embodiments described herein may be implemented, is shown in FIG. 3. Computing device 300 is typically a programmed general-purpose computer system, such as an embedded processor, system on a chip, personal computer, workstation, server system, and minicomputer or mainframe computer. Likewise, computing device 300 may be implemented in a communication device, such as a network switch, router, traffic distributor, etc. Computing device 300 may include one or more processors (CPUs) 302A-302N, input/output circuitry 304, network adapter 306, and memory 308. CPUs 302A-302N execute program instructions in order to carry out the functions of the present communications systems and methods. Typically, CPUs 302A-302N are one or more microprocessors, such as an INTEL CORE® processor. FIG. 3 illustrates an embodiment in which computing device 300 is implemented as a single multi-processor computer system, in which multiple processors 302A-302N share system resources, such as memory 308, input/output circuitry 304, and network adapter 306. However, the present communications systems and methods also include embodiments in which computing device 300 is implemented as a plurality of networked computer systems, which may be single-processor computer systems, multi-processor computer systems, or a mix thereof.

Input/output circuitry 304 provides the capability to input data to, or output data from, computing device 300. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 306 interfaces device 300 with a network 310. Network 310 may be any public or proprietary LAN or WAN, including, but not limited to the Internet.

Memory 308 stores program instructions that are executed by, and data that are used and processed by, CPU 302 to perform the functions of computing device 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 may vary depending upon the function that computing device 300 is programmed to perform. In the example shown in FIG. 3, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 3, for non-limiting examples in which computing device 300 implements a DNS server, memory 308 may include DNS routines and data 312. For non-limiting examples in which computing device 300 implements a traffic distributor, memory 308 may include traffic distributing routines and data 314. For non-limiting examples in which computing device 300 implements a load balancing node, memory 308 may include load balancing routines and data 316. These and other examples may include operating system 318. For example, DNS routines and data 312 may include routines and data that provide the capability to manage a database that maps domain names to IP addresses. Traffic distributing routines and data 314 may include routines and data that provide the capability to switch data traffic according to programmed traffic flow rules. Load balancing routines and data 316 may include routines and data that provide the capability to spread data traffic to other devices, such as back-end backend pool nodes. Operating system 320 may provide overall system functionality.

As shown in FIG. 3, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for data traffic distribution comprising:
allocating a plurality of publicly-accessible data traffic service network addresses to a load balancer service comprising a plurality of load balancing nodes, wherein each publicly-accessible data traffic service network address is associated with a different version of the load balancer service and with a plurality of back-end pool nodes, wherein each different version of the load balancer service comprises a change in a number of load balancing nodes, a change in a number of back-end pool nodes, or both;
receiving a plurality of data traffic flows;
distributing each data traffic flow to a version of the load balancer service based on a publicly-accessible data traffic service network address of each data traffic flow, wherein each version of the load balancer service distributes data traffic to the plurality of back-end pool nodes associated with each version of the load balancer service; and
transitioning to a first version of the load balancer service by allocating a publicly-accessible data traffic service network address associated with the first version of the load balancer service, and when a second version of the load balancer service has no more old in-progress connections, de-allocating a publicly-accessible data traffic service network address associated with the second version of the load balancer service.

2. The method of claim 1, further comprising:
de-allocating a publicly-accessible data traffic service network address associated with a version of the load balancer service.

3. The method of claim 2, wherein the allocated publicly-accessible data traffic service network addresses are registered in a Domain Name server.

4. The method of claim 1, wherein a configuration of each version of the load balancer service includes a set of data traffic flow rules.

5. The method of claim 4, wherein the data traffic flow rules are configured in a traffic distributor.

6. The method of claim 5, wherein the traffic flow rules are OpenFlow rules.

7. A system for data traffic distribution, the system comprising:
at least one Domain Name server storing an allocation of a plurality of publicly-accessible data traffic service network addresses to a load balancer service comprising a plurality of load balancing nodes, wherein each publicly-accessible data traffic service network address is associated with a different version of the load balancer service and with a plurality of back-end pool nodes, wherein each different version of the load balancer service comprises a change in a number of load balancing nodes, a change in a number of back-end pool nodes, or both; and
at least one traffic distributor receiving a plurality of data traffic flows and distributing each data traffic flow to a version of the load balancer service based on a publicly-accessible data traffic service network address of each data traffic flow, wherein each version of the load balancer service distributes data traffic to the plurality of back-end pool nodes associated with each version of the load balancer service,
wherein the system is further configured to transition a first version of the load balancer service by allocating a publicly-accessible data traffic service network address associated with the first version of the load balancer service and registering the allocated publicly-accessible data traffic service network address in the at least one Domain Name server, and when a second version of the load balancer service has no more old in-progress connections, de-allocating a publicly-accessible data traffic service network address associated with the second version of the load balancer service.

8. The system of claim 7, further comprising:
replacing in the at least one Domain Name server a publicly-accessible data traffic service network address associated with an old version of the load balancer service with a publicly-accessible data traffic service network address associated with a new version of the load balancer service.

9. The system of claim 7, wherein a configuration of each version of the load balancer service comprises a set of data traffic flow rules in the at least one traffic distributor.

10. The system of claim 9, wherein the traffic flow rules are OpenFlow rules.

11. A computer program product for data traffic distribution, the computer program product comprising a non-transitory computer readable storage having program instructions embodied therewith, the program instructions executable by a computer, to cause the computer to perform a method comprising:
allocating a plurality of publicly-accessible data traffic service network addresses to a load balancer service comprising a plurality of load balancing nodes, wherein each publicly-accessible data traffic service network address is associated with a different version of the load balancer service and with a plurality of back-end pool nodes, wherein each different version of the load balancer service comprises a change in a number of load balancing nodes, a change in a number of back-end pool nodes, or both;

receiving a plurality of data traffic flows;
distributing each data traffic flow to a version of the load balancer service based on a publicly-accessible data traffic service network address of each data traffic flow, wherein each version of the load balancer service distributes data traffic to the plurality of back-end pool nodes associated with each version of the load balancer service; and
transitioning to a first version of the load balancer service by allocating a publicly-accessible data traffic service network address associated with the first version of the load balancer service, and when a second version of the load balancer service has no more old in-progress connections, de-allocating a publicly-accessible data traffic service network address associated with the second version of the load balancer service.

12. The computer program product of claim 11, further comprising program instructions for:
de-allocating a publicly-accessible data traffic service network address associated with a version of the load balancer service.

13. The computer program product of claim 12, wherein the allocated publicly-accessible data traffic service network addresses are registered in a Domain Name server.

14. The computer program product of claim 11, wherein a configuration of each version of the load balancer service includes a set of data traffic flow rules.

15. The computer program product of claim 14, wherein the data traffic flow rules are configured in a traffic distributor.

16. The method of claim 15, wherein the traffic flow rules are OpenFlow rules.

\* \* \* \* \*